US006734884B1

(12) United States Patent
Berry et al.

(10) Patent No.: US 6,734,884 B1
(45) Date of Patent: May 11, 2004

(54) VIEWER INTERACTIVE THREE-DIMENSIONAL OBJECTS AND TWO-DIMENSIONAL IMAGES IN VIRTUAL THREE-DIMENSIONAL WORKSPACE

(75) Inventors: Richard Edmond Berry, Georgetown, TX (US); Scott Harlan Isensee, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 08/826,618

(22) Filed: Apr. 4, 1997

(51) Int. Cl.[7] .............................................. G06F 15/00
(52) U.S. Cl. ........................................ 345/848; 345/853
(58) Field of Search ................................ 345/848, 853, 345/762, 765, 744, 854, 863

(56) References Cited

U.S. PATENT DOCUMENTS

| | | | |
|---|---|---|---|
| 4,899,136 A | 2/1990 | Beard et al. ............... 340/706 |
| 4,939,507 A | 7/1990 | Beard et al. ............... 340/706 |
| 5,148,154 A | 9/1992 | MacKay et al. ............ 340/712 |
| 5,237,647 A | 8/1993 | Roberts et al. ............. 395/119 |
| 5,310,349 A | * 5/1994 | Daniels et al. .......... 345/156 X |
| 5,339,390 A | 8/1994 | Robertson et al. .......... 395/157 |
| 5,528,735 A | 6/1996 | Strasnick et al. ........... 395/127 |
| 5,555,354 A | 9/1996 | Strasnick et al. ........... 395/127 |
| 5,682,469 A | * 10/1997 | Linnett et al. .............. 345/334 |
| 5,689,628 A | * 11/1997 | Robertson ................... 345/355 |
| 5,689,669 A | * 11/1997 | Lynch et al. ................ 345/355 |

* cited by examiner

*Primary Examiner*—Cao (Kevin) Nguyen
(74) *Attorney, Agent, or Firm*—J. B. Kraft; Mark E. McBurney

(57) ABSTRACT

A system, method and computer program are provided for a virtual three-dimensional workspace wherein certain three-dimensional objects represent or serve as proxies for a variety of user interactive application programs. Such objects may be selected or triggered by the user to bring forth planar two-dimensional interactive user interfaces having images resembling those of their respective representative 3D objects so that a user may intuitively note the resemblance and select the appropriate object to result in the planar two-dimensional interactive interface appearing in front of the three-dimensional workspace. This two-dimensional planar interface remains active and unaffected by changes to its representative three-dimensional object during the course of navigation or otherwise.

3 Claims, 7 Drawing Sheets

VIEWER INTERACTIVE THREE-DIMENSIONAL OBJECTS AND TWO-DIMENSIONAL IMAGES IN VIRTUAL THREE-DIMENSIONAL WORKSPACE

CROSS-REFERENCE TO RELATED PATENT APPLICATIONS

The following two copending patent applications are related: the present application covering a three-dimensional workspace containing three-dimensional user interactive objects and stored in association with the objects; an application entitled "VIEWER INTERACTIVE THREE-DIMENSIONAL WORKSPACE WITH A TWO-DIMENSIONAL WORKPLANE CONTAINING INTERACTIVE TWO-DIMENSIONAL IMAGES", Ser. No. 08/826,616 filed Apr. 4, 1997 and an application entitled "VIEWER INTERACTIVE THREE-DIMENSIONAL WORKSPACE WITH INTERACTIVE THREE-DIMENSIONAL OBJECTS AND CORRESPONDING TWO-DIMENSIONAL IMAGES OF OBJECTS IN AN INTERACTIVE TWO-DIMENSIONAL WORKPLANE", Ser. No. 08/826,617, filed Apr. 4, 1997

BACKGROUND OF THE INVENTION

1. Technical Field

The present invention relates to user interactive computer supported display technology and particularly to such user interactive systems and methods which are user friendly, i.e. provide even noncomputer literate users with an interface environment which is easy to use and intuitive.

2. Prior Art

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/753,081, entitled "CREATING REAL WORLD OBJECTS" and Ser. No. 08/753,076, entitled "SYSTEM AND METHOD FOR MAINTAINING SIZE AND POSITION RELATIONSHIPS FOR NONRECTANGULAR REAL WORLD OBJECTS", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. 5,276,785.

A more recent copending application assigned to the Assignee of the present invention is entitled, "VIEWER INTERACTIVE OBJECT IN VIRTUAL THREE-DIMENSIONAL WORKSPACE", D. Bardon et al. which covers face views of virtual three-dimensional objects which may be triggered to appear on a display by interactive viewer input.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects he is seeking to relate to in the manner he is seeking to relate to such objects even when these objects are arranged in 3D space in what appears to be infinite configurations.

In these virtual reality 3D environments as in the real world, the viewer or user is relating to the virtual objects in order to carry out a wide variety of tasks, some of which are quite simple and some very complex. In order for the user to stay focused and carry out his tasks as expeditiously as possible, it would be optimum for the virtual 3D system to provide simpler user interfaces for simple tasks and more comprehensive user interfaces for more complex tasks.

Thus, when the viewer's task is a simple one such as getting more information about a current movie film or about a newly released music CD, the user may be presented with his information in an interface as simple as a face view of a virtual 3D object which contains the information. For example, in the virtual 3D world or workspace, the viewer may navigate to a virtual three-dimensional object of a theater and get his desired movie film information from a face view of the object which presents a marquee of the theater. Similarly, the viewer seeking CD information might navigate to and be presented with a face view of a virtual CD vending kiosk which presents him with his desired information. The above-mentioned patent application, "VIEWER INTERACTIVE OBJECT IN VIRTUAL THREE-DIMENSIONAL WORKSPACE", D. B. Bardon et al., describes such face views of 3D virtual objects. With such simple tasks, the viewer notes his desired information, perhaps makes some simple choices and moves on with his navigation through the virtual 3D workspace.

On the other hand, the navigating viewer's task may be a more complex one like tracking and updating product sales information of a business or group of businesses or within a report or filing a tax statement.

The present invention permits the viewer or user to utilize conventional two-dimensional interfaces within his three-dimensional virtual reality workspace simultaneously with his continued navigation through his three-dimensional, workspace.

In this connection, the present invention serves as a bridge between the three-dimensional virtual reality workspace environment which is a windowless world and the existing conventional viewer interactive interfaces which have the viewer interactively interface with application programs such as spreadsheet or CAD/CAM programs through a planar two-dimensional format using traditional windowing arrangements. In other words, the systems of the present invention may be designed to permit the viewer to callup and use window programs in a planar two-dimensional environment.

SUMMARY OF THE INVENTION

Before setting forth the present invention, we should establish some basic characteristics of the virtual three-dimensional environment as described in the above-referenced patents and applications. It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint; The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused.

As set forth above, it is easier for the viewer to stay focused when the task for which he is accessing the object is a simple one. The present invention deals with helping viewers to stay focused in more complex tasks.

The present invention operates within the previously described data processor controlled display system for displaying a virtual three-dimensional workspace having three-dimensional objects which are interactively functional, i.e. may be picked by the viewer or user for various computer interactive functions.

The present invention has associated with and stored for each of a plurality of such functional virtual objects, at least one planar two-dimensional image of the virtual object, i.e. the two-dimensional image has sufficient visual similarity to the object which it represents that the viewer or user will intuitively connect the two as he addresses the three-dimensional workspace. The system provides user interactive means so that the user can select one of the virtual objects and means responsive to such a user selection for displaying the two-dimensional planar image associated with the selected object.

The system further provides user interactive means to this planar two-dimensional image so that the user may carry out conventional computer functions such as spreadsheets or word processing within this two-dimensional image. In accordance with an aspect of the present invention, this planar two-dimensional image may be user interactively interfaced to a variety of standard computer applications such as word processing, spreadsheets or CAD/CAM.

A key aspect of the present invention is that this interactive two-dimensional image remains permanently associated with the three-dimensional object which represents it, and does not change even when its representative three-dimensional object undergoes changes such as changes in position or size.

In the manner described above, once an interactive planar two-dimensional image is opened, the user may retain it as an active access to the computer function being carried out interactively within the image, e.g. an application program even when the user is also navigating through the virtual three-dimensional workspace and is proceeding to or relating to a subsequent three-dimensional object other than the three-dimensional object associated with the selected two-dimensional image.

In order to understand the present invention, it is important its advantages over conventional two-dimensional systems be considered. In such two-dimensional systems, the potential functions and applications of the display systems are represented by an array of icons which the user may respectively select in order to bring forth that particular computer functional application interface on the display. Other than representing a particular computer function or program, these conventional two-dimensional icons of the prior art do not act in combination with other elements as do the three-dimensional object of the present invention to provide interrelated three-dimensional environment through which the viewer may navigate. Such a three-dimensional virtual workspace environment permits even the most complex of computer setups to be intuitively organized with respect to the viewer so that the viewer may navigate and make appropriate selections and combinations of selections.

As mentioned hereinabove, the present invention functions as a bridge between the traditional windowing two-dimensional interactive user environments to the present three-dimensional world which is windowless, i.e. the user may still carry out his window interface two-dimensional planar interactive programs in this newer three-dimensional world.

In accordance with a more particular aspect of the present invention, because of the object oriented programming environment which is used to implement the present invention, the virtual three-dimensional object and its associated planar two-dimensional functional image are stored in the computer and treated as an entity whereby the three-dimensional object may be changed in size, position and appearance without affecting its relationship with the interactive two-dimensional image which it represents. On the other hand, the function of the two-dimensional image cannot be deleted or removed from the system unless its associated representative three-dimensional image is removed, i.e. the only way to remove the function represented by the two-dimensional image is to remove the three-dimensional object which serves as its proxy.

DETAILED DESCRIPTION OF THE PREFERRED EMBODIMENT

Figure 1:
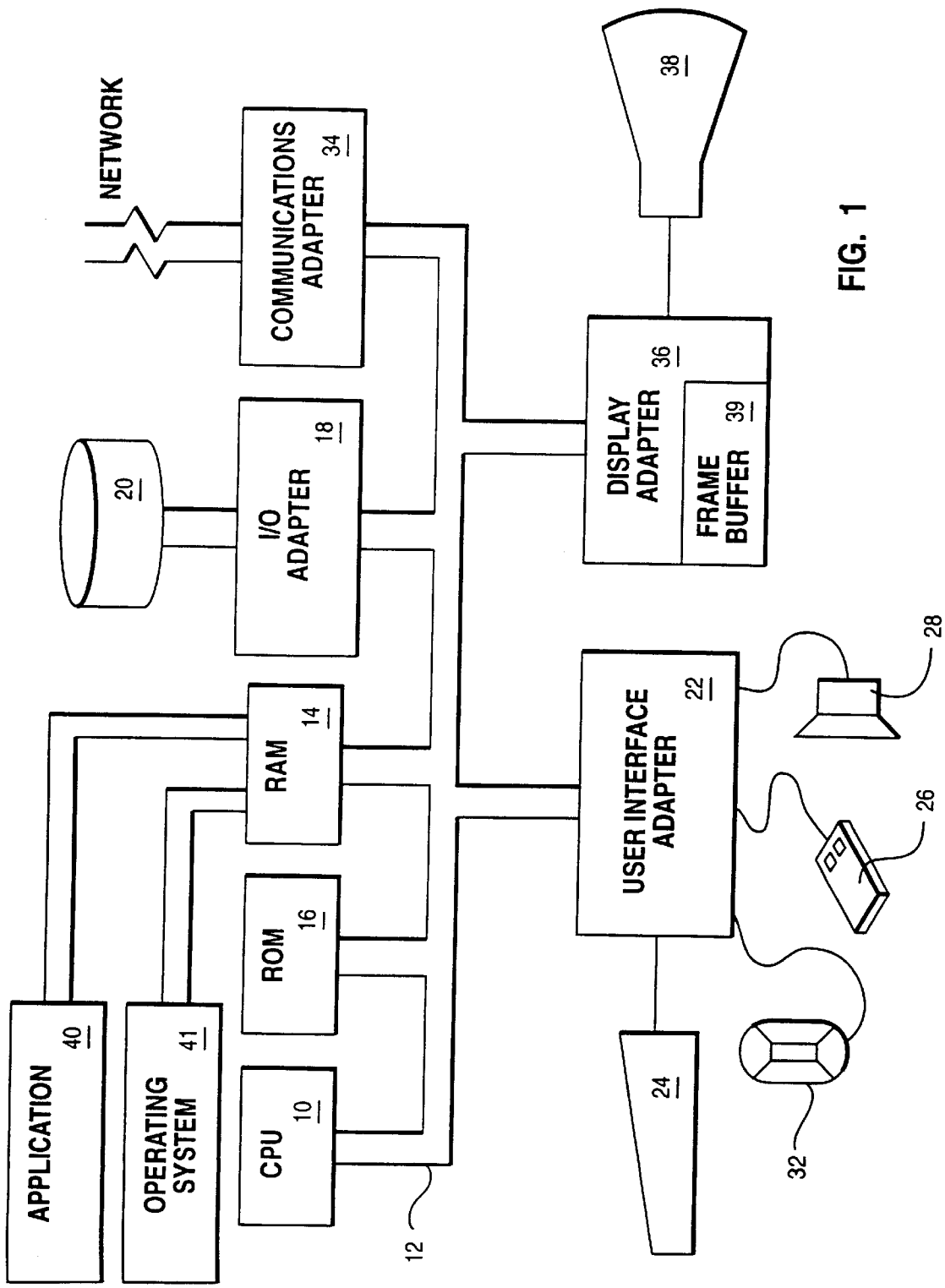
FIG. 1 is a block diagram of a data processing system including a central processing unit which is capable of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. 5,276,785 (Mackinlay et al., Jan. 4, 1994) is an example of the design techniques available to such three-dimensional workspace interface designers.

The description of the present invention often refers to navigation within the three-dimensional virtual workspace. The workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. 5,555,354 (Strasnick et al., Sep. 10, 1996) describes some known navigation techniques.

The three-dimensional objects which will be subsequently described in embodiments of the present invention may be best implemented using object oriented programming techniques, such as the object oriented techniques described in the above-mentioned copending application 08/753,076 assigned to the Assignee of the present invention. The objects of that copending application are implemented using the C++ programming language. C++ is a compiled language.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing.

Therefore, those skilled in the art will understand how the present invention is implemented using object oriented programming techniques as described above.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system,available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation application program 40 such as the previously described VRT of Superscape in the RAM 14 of the system of FIG. 1. Also stored on the RAM will be a suitable operating system 41 such as DOS or Windows.

Figure 2:
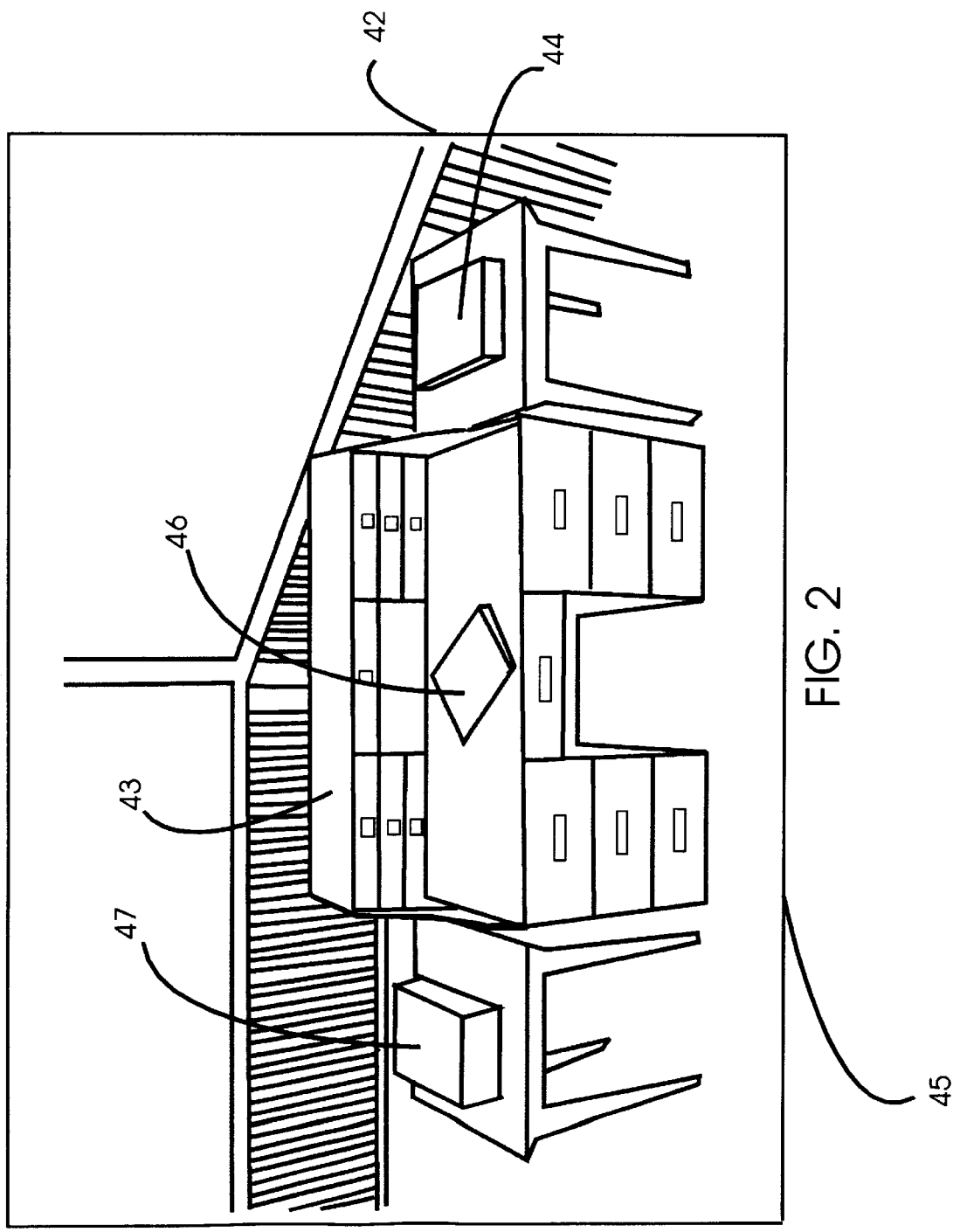
FIG. 2 shows a typical virtual reality workplace in accordance with the present invention at an initial viewpoint.

An embodiment of the present invention will now be described with respect to the virtual reality workspace shown in FIG. 2. The workspace 42 is shown as an office environment with a desk 43, as well as a telephone answering machine 44, as well as other office equipment and tables which need not be described here. On the desk 43 is a book 46. The workspace 42 is centered within a viewpoint interface which is presented to the viewer on display monitor 38 of FIG. 1. In accordance with conventional techniques, the user may control the viewpoint 45 through a conventional I/O device such as mouse 26 or FIG. 1 which operates through the user interface 22 of FIG. 1 to call upon VRT programs in RAM 14 operating with the operating system 41 to create the images in frame buffer 39 of display adapter 36 to control the display on monitor 38. Using conventional virtual three-dimensional workspace navigation techniques, the viewpoint interface 45 of FIG. 2 is changeable as the viewer moves closer or backs away from objects in the workspace or moves to right or to the left in the workspace. All this may be controlled by a suitable I/O device such as mouse 26 of FIG. 1. The previously mentioned devices within workspace 42 are functional three-dimensional objects such as book 46, telephone answering equipment 44 or dictation player 47. The images for these various objects are stored as data from which the objects may be created on the display in RAM 14 of FIG. 1 in connection with the VRT program.

Figure 3:
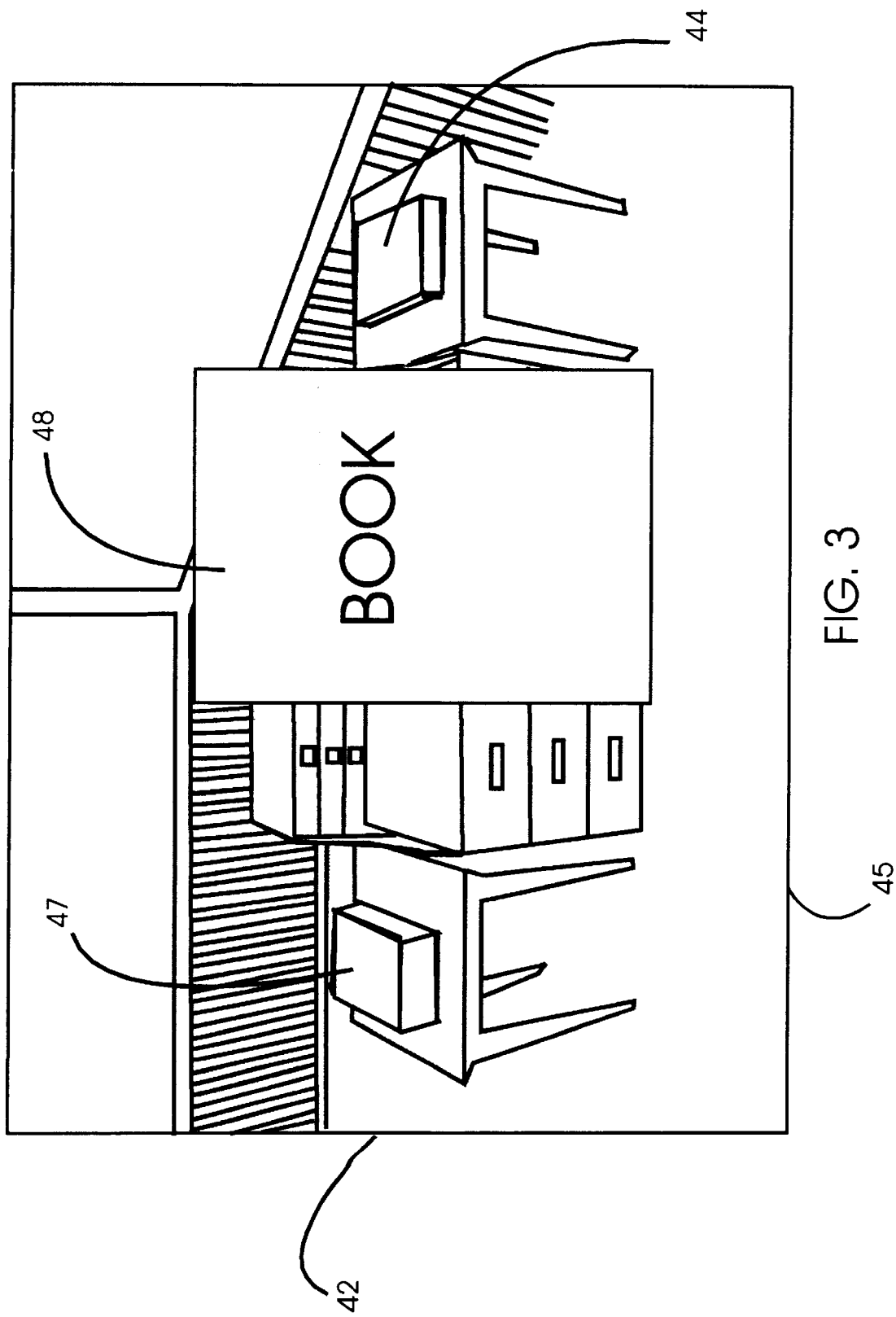
FIG. 3 is a representation of an initial planar two-dimensional image interface set up in front of the three-dimensional workspace of FIG. 2.
Figure 4:
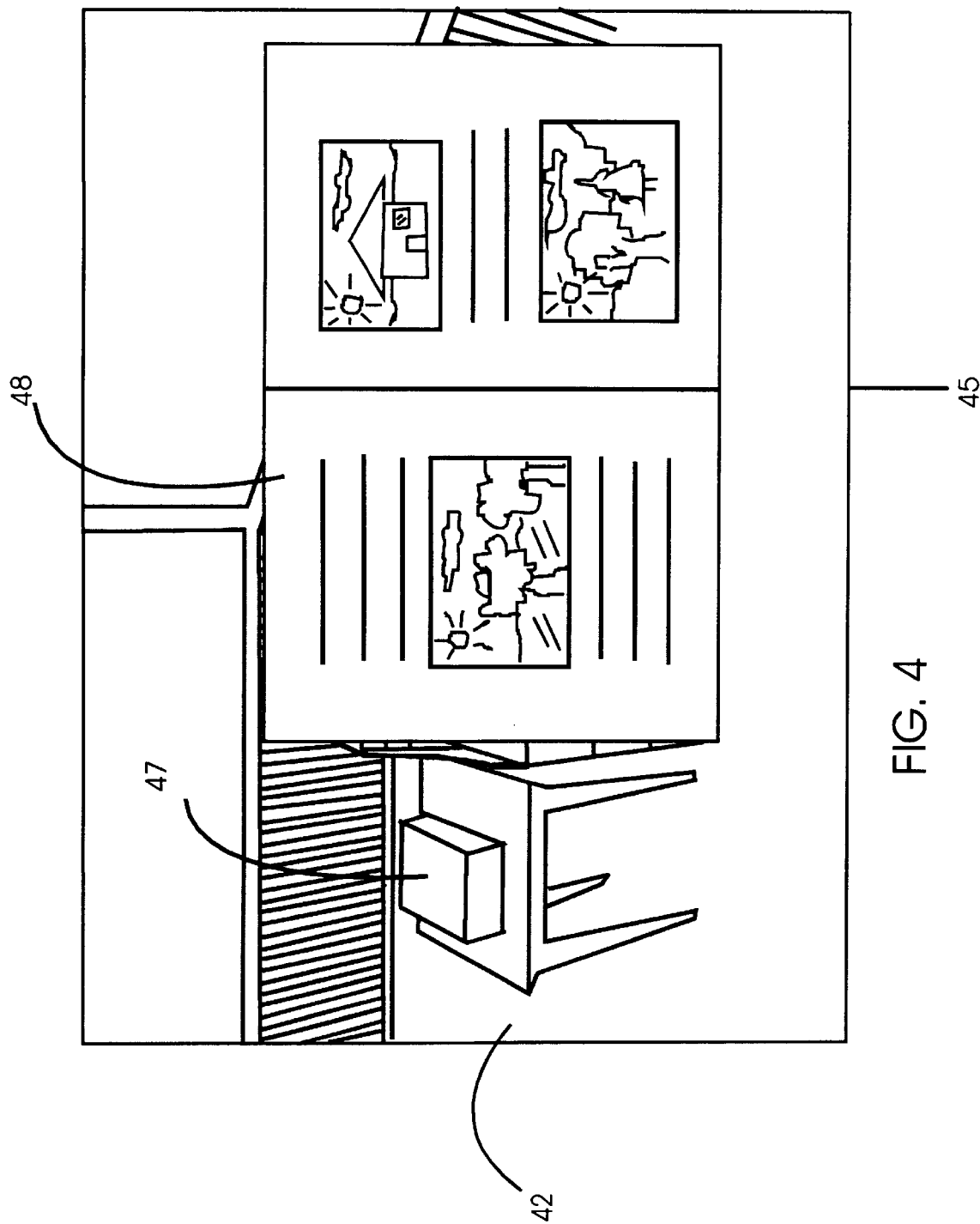
FIG. 4 is an initial representation of the three-dimensional workspace with the two-dimensional interactive image interface in front of it.

Let us assume that a user or viewer is navigating through a three-dimensional workspace in which the viewpoint 45 of FIG. 2 is a stage. When he reaches the viewpoint 45 in FIG. 2 the viewer has need to access some extensive reading material which is stored and represented by book object 46. The system provides for the viewer selection of any one of the objects through some appropriate pointing device such as mouse 26 in FIG. 1. When the viewer clicks onto book 46 using the mouse 26 in FIG. 1, the result is, as shown in FIG. 3: a planar two-dimensional image 48 as shown in FIG. 3 of the book appears on the display screen in front of the three-dimensional workspace 42 as shown in viewpoint 45. The image 48 of book 46 is interactive, i.e. the viewer by suitable means such as clicking with mouse 26 in FIG. 1 may turn the pages in the book and read the material contained therein. With reference to FIG. 4, two-dimensional book image 48 is shown after several of the pages have been interactively turned to a particular position in the book page hierarchy.

A key to the present invention is that the viewer may interactively relate to the two-dimensional image plane such as that of book 48 while the three-dimensional world behind the object remains active and navigatable. This is illustrated with reference to the differences between FIGS. 4 and 5. In order to reach the viewpoint of the three-dimensional workspace shown in FIG. 5, the viewer, using conventional navigation means as described above, has shifted the viewpoint from the viewpoint of FIG. 4 to that of FIG. 5. Note, the viewpoint has shifted towards the right of desk 43 in FIG. 5. However, the planar two-dimensional image 48 of the book has not shifted and been active so that the user may interactively still shift pages and access material within the two-dimensional image 48 while the navigational changes have taken place. During such navigation, of course, it is seen that the three-dimensional object within workspace 42 will change in position as well as size as the navigation moves towards or away from these objects; that includes the original book object 46 (FIG. 2) which was selected to trigger the two-dimensional interactive book image 48.

Figure 5:
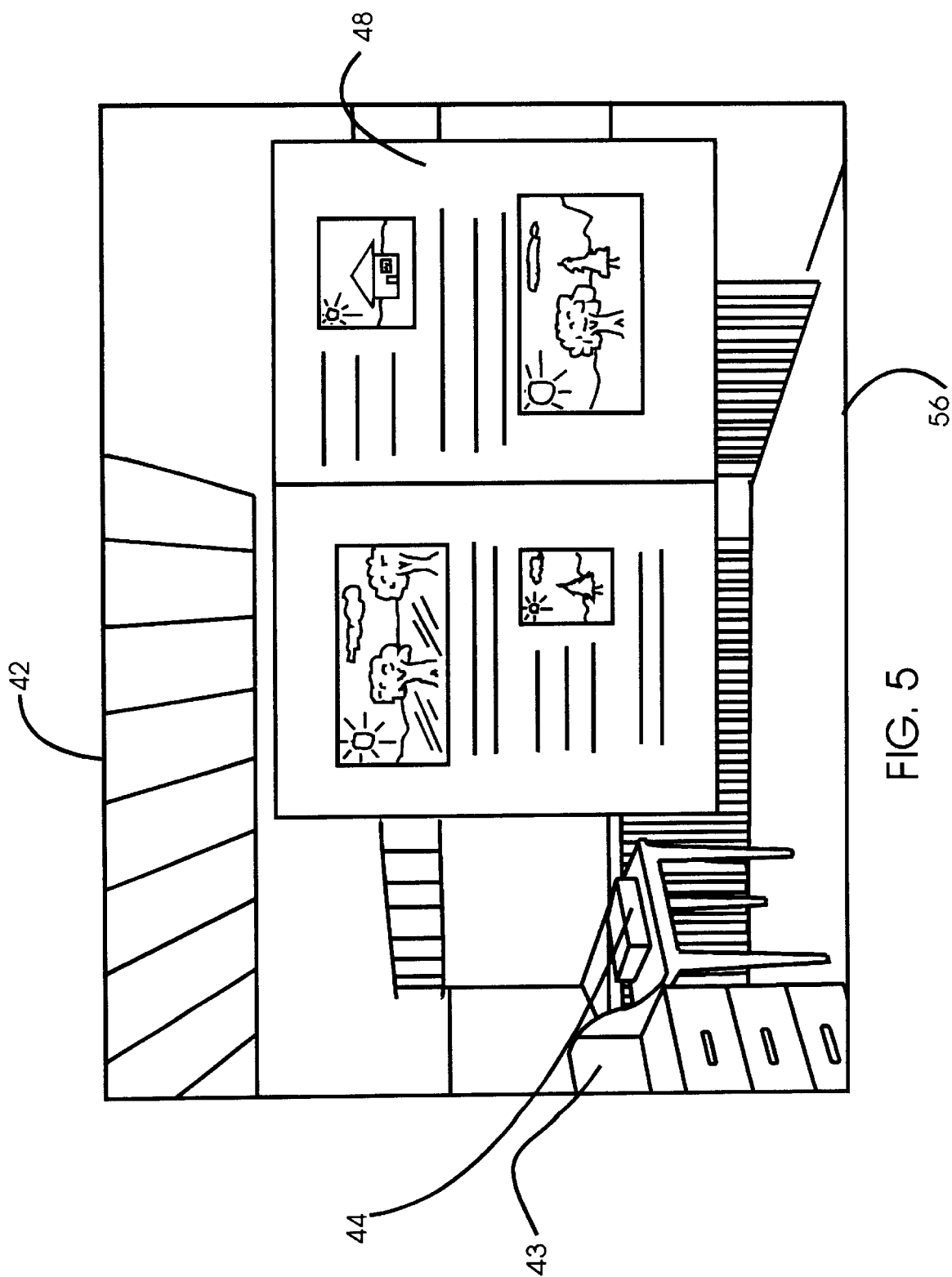
FIG. 5 shows the workspace initially of FIG. 4 wherein the viewpoint has been changed to a subsequent position through navigation.

While we have illustrated the present invention with a two-dimensional planar user interface wherein the user may retrieve information interactively from a book, it will be understood that user interactive image interface 48, FIG. 5, could have been any two-dimensional interface to an application program for which the three-dimensional object serves as a proxy in the three-dimensional workspace. The interface could have been one representing a statistical program in which case interface image 48 would have been that of a spreadsheet. Interface 48 could have also been a planar two-dimensional image providing access to a CAD/CAM applications program. The viewer interface may, of course, be any conventional two-dimensional window interface.

Figure 6A:
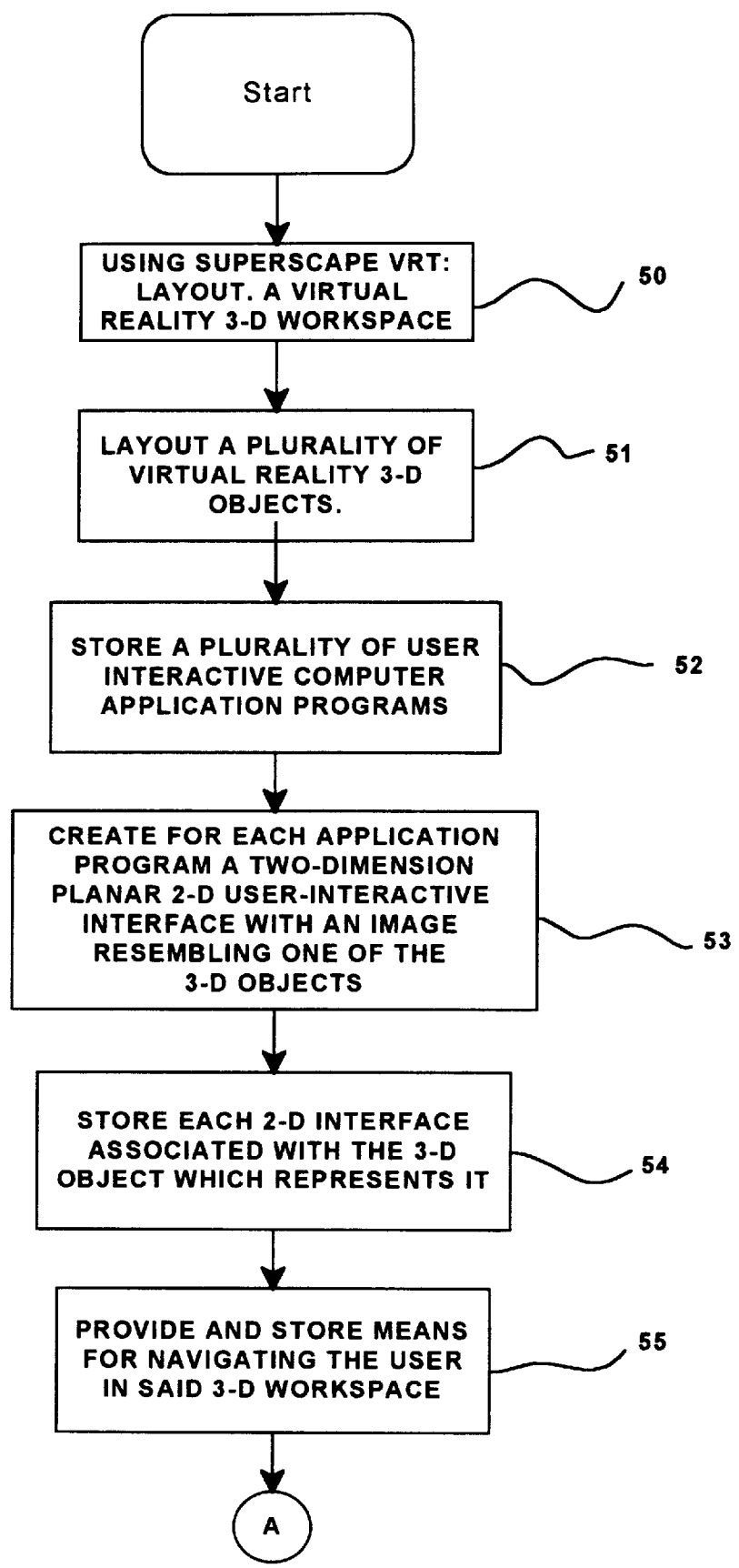
FIGS. 6A and 6B are flowcharts of a process implemented by the present invention for creating the previously described two-dimensional planar user interfaces in front of the three-dimensional workspace.
Figure 6B:
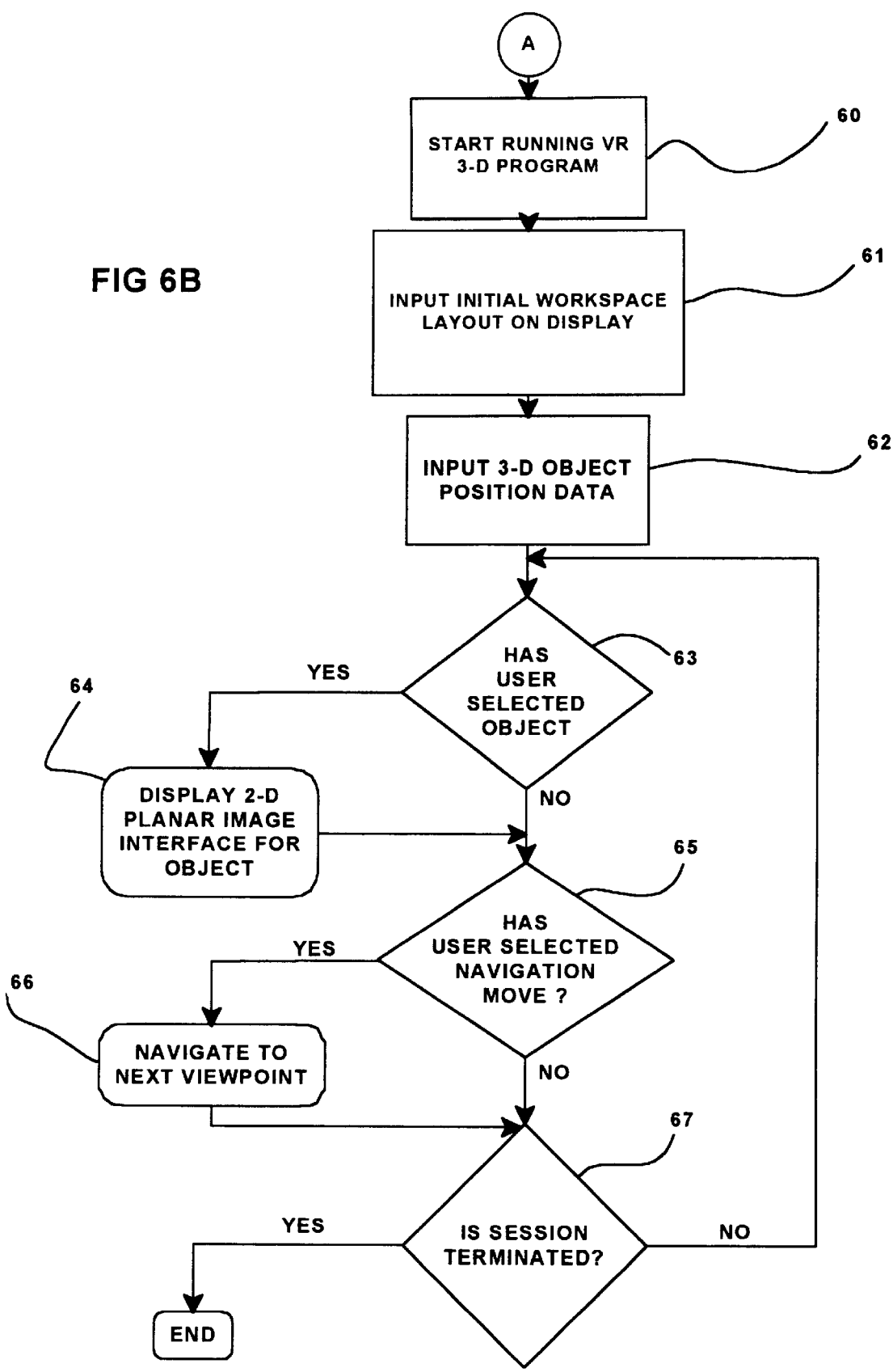

Now with reference to FIGS. 6A and 6B, we will describe a process implemented by the present invention in conjunction with the flowcharts of FIGS. 6A and 6B. The flowcharts are in two parts: the steps in FIG. 6A relate to the development of the virtual reality landscape objects, the application programs with which particular objects are associated, as well as the two-dimensional interactive user interfaces provided for such application programs. The developments are made in accordance with the present invention using the previously described Superscape VRT object oriented programming toolkit.

First, step 50, FIG. 6A, the virtual reality three-dimensional workspace, for example workspace 42, FIG. 2, is created and stored. Next, step 51, the virtual reality 3D objects are created and stored. These would include the object oriented code representation of such objects as book 46, telephone answering machine 44 or dictation player 47 in FIG. 2. Next, step 52, several user interactive computer programs are stored on the system of FIG. 1. These would be stored in suitable storage means accessible to RAM 14 of FIG. 1 wherein the application programs would be loaded when activated. Next, step 53, the programmer will design or create for each application program stored in the computer a two-dimensional planar user interactive interface with an image resembling one of the 3D objects which is to represent or be the proxy for the respective program. By resembling we mean that the two-dimensional image must be such that the user of the system will intuitively understand that the three-dimensional object chosen to represent or stand as the proxy for the two-dimensional planar interface to the application program will have sufficient likeness to the program and its two-dimensional interface that the user can make the connection between the two intellectually when confronted with the need to activate the application program. Then, step 54, each two-dimensional interactive interface is stored associated with the three-dimensional object which represents it or is a proxy for it.

In this connection, it. should be noted that with the recent advance of object oriented programming techniques, such as those described above and including such object oriented techniques as OpenGL or the above-described VRT, it is possible to create software capsules or entities which not only define the object itself but associated the object with an interactive planar two-dimensional image interface such as book 49 in FIGS. 3, 4 or 5. In this manner, the two-dimensional interactive planar image interface such as book 48 is permanently associated with the particular three-dimensional object which in the present case is book 46 or FIG. 2, so that even if the position of the object 46 is subsequently changed in the workspace or the size of object 46 is changed during navigation, the two-dimensional interactive image 48 will remain permanently associated with the book object 46. Then, step 55, a conventional means is provided for navigating through the virtual reality workspace 42 in FIGS. 2 through 5, using for example the navigation technique of changing the viewpoint, such as viewpoint 45.

The process now proceeds to point A in FIG. 6B whereat the created virtual reality workspace program is run, step 60. As previously mentioned, the program is run on a system such as that shown in FIG. 1 with the particular application program 40 herein being loaded on RAM 14 and connected to display adapter 36 which forms the stored images via frame buffer 39 controlling display monitor 38. The program initially sets up the workspace layout on the display as well as the object layout and the positions of the objects in the workspace, steps 61 and 62.

At this point we will proceed to the aspect of the program applicable to the present invention. First, in decision block 63, the system determines whether the viewer has as yet selected a particular object which is representative or serving as a proxy for a particular application program stored in the computer. If there has been such a selection, i.e. book object 46 in FIG. 2, then, step 64, the system displays the two-dimensional planar image interface for that object, i.e. planar book image 48 in FIGS. 3 through 5. If no object has been selected or if, as in step 64 an object has been selected and its associated planar two-dimensional image has been displayed, the system then proceeds to decision block 65 where a determination is made as to whether the user wishes to navigate further, i.e. change the viewpoint. If the viewer wishes to change the viewpoint, then the process proceeds to step 66 where the system navigates to the next viewpoint. This is the transition from viewpoint 45 as shown in FIG. 4 to viewpoint 56 as shown in FIG. 5. During such a navigation in three-dimensional space, the book interface image 48 remains unchanged by the navigation. It is, of course, simultaneously accessible and changeable by the viewer if he wishes to proceed to subsequent pages. If the decision from block 65 is that no navigation move has been selected or if the process has proceeded through step 66 and navigated to the next viewpoint, the process then proceeds to decision block 67 which is merely a continuing determination as to whether the particular session has been terminated. If it has, the system ends. If it has not, then the output from decision block 67 proceeds back to previously described decision block 63.

In considering the present invention, it must be emphasized that the planar two-dimensional image interface, such as interface 48, is permanently associated with its object, which in the present example was book image 48, and can only be eliminated from the process by eliminating the book object 46 itself.

Although certain preferred embodiments have been shown and described, it will be understood that many changes and modifications may be made therein without departing from the scope and intent of the appended claims.

What is claimed is:

1. A data processor controlled display system for displaying a virtual three-dimensional workspace comprising:

means for displaying a plurality of virtual three-dimensional objects in said workspace;

means for storing for each of said virtual objects, at least one planar two-dimensional image of said virtual object;

user interactive means for selecting one of said virtual objects;

means responsive to said selecting means for displaying the two-dimensional image of said selected object;

user interface means for navigating away from said selected virtual object within said three-dimensional workspace, and means for user interactive input to said displayed two-dimensional image, said input means remaining interactive after the user has navigated away from said selected virtual object.

2. A data processor implemented method for displaying a virtual three-dimensional workspace comprising:

displaying a plurality of virtual three-dimensional objects in said virtual workspace;

storing for each of said virtual objects, at least one planar two-dimensional image of said virtual object;

user interactively selecting one of said virtual objects;

displaying the two-dimensional image of said selected object in response to said user selection;

navigating away from said selected virtual object within said three-dimensional workspace; and user interactively inputting to said displayed two-dimensional image after the user has navigated away from said selected virtual object.

3. A computer readable program having data structures included on a computer readable medium which causes the display on a data processor controlled display of a virtual three-dimensional workspace comprising:

means for displaying a plurality of virtual three-dimensional objects in said workspace;

means for storing for each of said virtual objects, at least one planar two-dimensional image of said virtual object;

user interactive means for selecting one of said virtual objects;

means responsive to said selecting means for displaying the two-dimensional image of said selected object;

user interface means for navigating away from said selected virtual object within said three-dimensional workspace, and means for user interactive input to said displayed two-dimensional image, said input means remaining interactive after the user has navigated away from said selected virtual object.

* * * * *